United States Patent [19]

Eberhard et al.

[11] Patent Number: 4,700,931
[45] Date of Patent: Oct. 20, 1987

[54] RESILIENT MOUNTING

[75] Inventors: Günter Eberhard, Gehrden; Jürgen Heitzig, Hanover, both of Fed. Rep. of Germany

[73] Assignee: Continental Gummi-Werke Aktiengesellschaft, Hanover, Fed. Rep. of Germany

[21] Appl. No.: 4,790

[22] Filed: Jan. 8, 1987

Related U.S. Application Data

[63] Continuation of Ser. No. 733,211, May 10, 1985, abandoned.

[30] Foreign Application Priority Data

May 15, 1984 [DE] Fed. Rep. of Germany ....... 3417927

[51] Int. Cl.$^4$ ............................................. F16F 13/00
[52] U.S. Cl. ....................................... 267/35; 180/300; 180/902; 248/562; 267/140.1; 280/712
[58] Field of Search ..................... 267/140.1, 140.2, 35, 267/8 R, 152; 280/712; 248/562, 634, 636; 180/300, 902

[56] References Cited

U.S. PATENT DOCUMENTS

| 4,159,091 | 6/1979 | LeSalver et al. ............ 267/140.1 X |
| 4,352,487 | 10/1982 | Shtarkman ............................. 267/35 |
| 4,407,491 | 10/1983 | Kunihiro et al. ................. 267/140.1 |
| 4,424,961 | 1/1984 | Takei ................................ 267/35 X |

FOREIGN PATENT DOCUMENTS

| 115417 | 8/1984 | European Pat. Off. ......... 267/140.1 |
| 8843 | 1/1983 | Japan ................................... 248/562 |

Primary Examiner—George E. A. Halvosa
Attorney, Agent, or Firm—Becker & Becker, Inc.

[57] ABSTRACT

A resilient mounting for engines, machine units, etc. During driving operation, resilient motor mounts having a supporting diaphragm-like element which oscillates freely via an air cushion generate undesirable and annoying noises, and they also transmit to the chassis and the body, in a practically undamped fashion, low-frequency oscillations. The present invention therefore provides an effective acoustic uncoupling, without adversely affecting the spring or shock absorption characteristic, via a damping device in the form of a flexible diaphragm which is provided with a throttled transfer hole. This diaphragm is attached between the air cushion and a supplemental space which receives compressed air, the pressure of which can be regulated.

1 Claim, 1 Drawing Figure

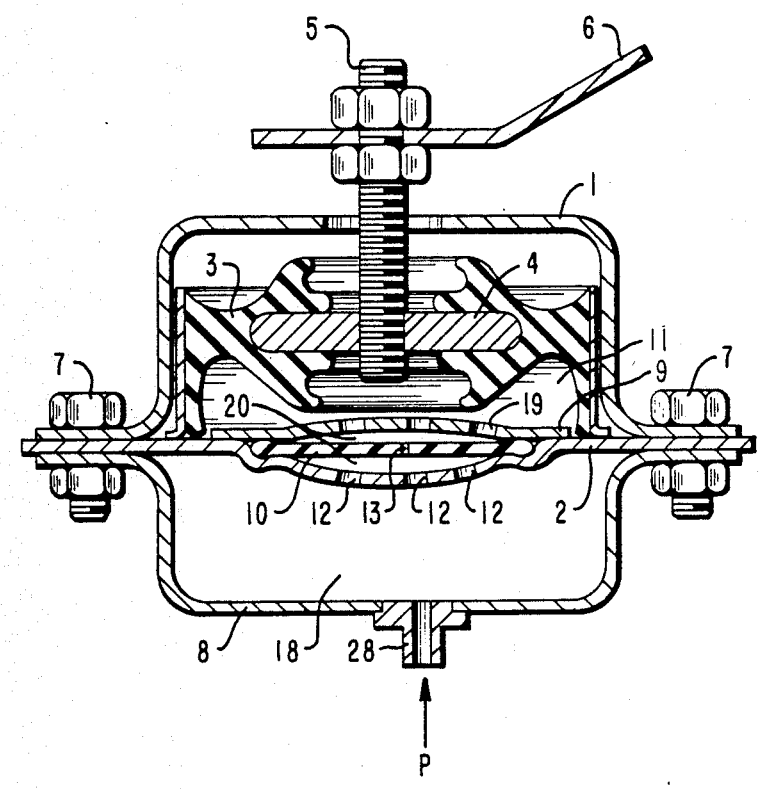

RESILIENT MOUNTING

This application is a continuation of application Ser. No. 733,211 filed May 10, 1985, now abandoned.

BACKGROUND OF THE INVENTION

1. Field of the Invention

The present invention relates to a resilient mounting, for engines, machine units, etc., having an air cushion formed by a rigid housing and a diaphragm-like shock absorber which closes off the upper opening of the housing; the shock absorber, via a thrust plate connected thereto, directly receives the load of the mounting, and the housing, via through-holes in a rigid base plate which closes off the lower opening of the housing, is in constant communication with a supplemental space which receives compressed air, the pressure of which can be regulated.

2. Description of the Prior Art

The cushioning or shock absorbing characteristic of known mountings of this general type is predominantly determined by the shape and the properties of the freely oscillating diaphragm-like element, with adaptations to changing loads being possible over a wide range by regulating the introduced counter pressure. In all cases, the mountings, especially when used as motor mounts in motor vehicles, generate noise under influence of jolting emanating from the driving operation. Furthermore, these heretofore known mountings transmit low-frequency oscillations, practically without any damping, to the chassis and the body, i.e. to the supporting structure.

An object of the present invention therefore is to improve the acoustic properties of air cushion mountings having rubber spring or shock absorber elements without an undesired increase in the dynamic rigidity of the mounting.

BRIEF DESCRIPTION OF THE DRAWING

This object, and other objects and advantages of the present invention, will appear more clearly from the following specification in conjunction with the accompanying schematic drawing, which is a cross-sectional view of one embodiment of the inventive mounting in the form of an air cushion mounting.

SUMMARY OF THE INVENTION

The resilient mounting of the present invention is characterized primarily by a flexible diaphragm which spans the through-holes in the base plate, and which is provided with a transfer hole having a cross-sectional area which is less than that of the through-holes; this flexible diaphragm can be deformed in both directions, between limit stop surfaces, in response to pressure differences between the interior of the housing and the supplemental space.

One of these limit stop surfaces can be formed by the base plate, and the other limit stop surface can be formed by a rigid counter-plate which is fixedly attached at a distance to the base plate, with its periphery sealingly cooperating with the latter or with the housing; the counter-plate is also provided with through-holes. Pursuant to further specific features of the present invention, the periphery of the flexible diaphragm may be sealingly secured between the base plate and the counter-plate. Expediently, the base plate and the counter-plate are each arched away from the diaphragm in a dome-like manner, and define a space which is symmetrically, centrally spanned by the diaphragm in the non-deformed state of the latter, and is continuously open relative to the interior of the housing and to the supplemental space.

With simple structural means, the present invention provides an effective acoustic uncoupling of air-damped resilient mounting, with the acoustic properties being improved without impairing the spring or shock absorption characteristics. Since the normally occurring disturbance oscillations invariably have considerably greater amplitudes than do the higher-frequency noises, and since the diaphragm, which is freely secured in such a way that it has clearance of motion, can initially freely follow these oscillations, the damping becomes effective only after a specified oscillation amplitude limit. This guarantees that the spring or shock absorption characteristic of the mounting is not adversely affected by small amplitudes.

DESCRIPTION OF PREFERRED EMBODIMENTS

Referring now to the drawing in detail, the cylindrical housing 1 is closed off at the bottom by a base plate 2. Disposed in the housing 1 is a diaphragm-like rubber spring or shock absorber 3, which is vulcanized into a metal casing. The shock absorber 3 is held sealingly in place on the base plate 2, and tightly embraces a pressure or thrust plate 4. The plate 4, in turn, supports a connecting bolt 5 which extends outside of the housing 1. When using the inventive mounting for resiliently supporting, for example, the engine of a motor vehicle, the connecting bolt 5 is connected to the bottom bracket 6 of the non-illustrated engine, while the housing 1 is bolted or otherwise connected to the chassis of the vehicle via the base plate 2, which is connected to the housing 1 in a flange-like connection by means of bolts 7. The interior 11 of the housing is delimited by the rubber spring or shock absorber 3 and the base plate 2, and forms an air cushion against which, during practical use of the mounting, the shock absorber inwardly deflects under the effect of load.

The mounting housing 1 continues downwardly, beyond the base plate 2, into an annular cap 8, which surrounds a supplemental space 18, and is tightly bolted to the housing flange by means of the bolts 7. By means of through-holes 12 in the base plate 2, the supplemental space 18 is in constant communication with the interior 11 of the housing below the shock absorber 3, and, via a connector 28 disposed on the annular cap 8, can receive compressed air, the pressure of which can be regulated, from a non-illustrated source of compressed air. The central portion of the base plate 2 contains the through-holes 12, and is arched downwardly in the manner of a dome. On that side which faces the shock absorber 3, the base plate 2 supports a rigid counter-plate 9, which in the same manner, but in the opposite direction, also has an arched central portion which is provided with through-holes 19. In conjunction with the base plate 2, the counter-plate 9 forms an approximately lens-shaped space 20 between the spaces 11 and 18. The space 20 is spanned by a flexible diaphragm 10, which is sealingly secured between the base plate 2 and the counter-plate 9, but which does not completely seal off the spaces 11 and 18 from one another. Rather, via a hole 13 having a cross-sectional area which is much narrower than are the through-holes 12, 19, the diaphragm 10 enables a throttled equalization of pressure differences on either side of the diaphragm.

The base plate 2 and the counter-plate 9 form travel or limit stops for the diaphragm 10, and delimit in both directions the free deformability of the diaphragm in the range of the pressure fluctuations caused by the oscillations of the shock absorber 3. The pressure equalization is initially induced by deformation of the membrane, and only after the latter rests against one of the plates 2 or 9 is transfer of air effected through the throttle hole 13. In this manner, it is possible to make the damping of the spring or shock absorber oscillations effective from a specified oscillation amplitude limit as a function of the structurally prescribed freedom of movement of the diaphragm 10.

The present invention is, of course, in no way restricted to the specific disclosure of the specification and drawing, but also encompasses any modifications within the scope of the appended claims.

What we claim is:

1. A resilient mounting as a spring- and damping-medium containing air rather than hydraulic fluid and having a genuine rubber/air spring element arrangement as a unique spring-damper system that receives a load and having an air cushion formed by a rigid housing having an upper opening as well as a lower opening and a diaphragm-like resilient shock absorber which closes off the upper opening of said housing; said shock absorber, via a thrust plate connected thereto, directly receives the load of said mounting, and said housing, via through-holes in a rigid base plate which closes off the lower opening of said housing, is in constant communication with a supplemental space which is located on that side of said base plate remote from said shock absorber, and which receives compressed air, the pressure of which can be regulated and varied via compressibility of air; the improvement in combination therewith which comprises: a flexible diaphragm which spans said through-holes in said base plate, and which is provided with a throttled transfer hole that throttles flow of transferred air as the spring- and damping-medium and having a cross-sectional area which is less than that of said through-holes; said mounting being provided with limit stop surfaces between which said flexible diaphragm is deformable in both directions, namely toward and away from said shock absorber, in response to pressure differences between said supplemental space and the interior of said housing between said shock absorber and said base plate so that possibility exists to have varied compressibility of air accompanied by variable spring-characteristic of the rubber/air spring element whereby spring characteristics thereof overlap each other and also within the rubber/air spring arrangement to attain an aimed and variable damping of spring movements in that air is employed both as practical inertia-less flow medium as the spring- and damping-medium for damping high and low frequency vibrations and oscillations and air also is employed as an additionally elastic-compressible spring; to provide the air cushion with an effective acoustic uncoupling without adversely affecting spring or shock absorption characteristic; a first one of said limit stop surfaces being formed by said base plate, and a second one of said limit stop surfaces being formed by a rigid counter-plate which is fixedly attached at a distance from said through-holes of said base plate; said counter-plate also being provided with through-holes, and having a periphery which cooperates sealingly with either said base plate or said housing; said flexible diaphragm having a periphery which is sealingly secured between said base plate and said counter-plate; said base plate and said counter-plate each being arched away from said flexible diaphragm in a dome-like fashion; said base plate and said counter-plate defining and enclosing a space which is centrally and symmetrically spanned by said flexible diaphragm in the nondeformed state of the latter; by means of said through-holes of said base plate and of said counter-plate, said last-mentioned space always being in communication with the interior of said housing and with said supplemental space; said counter-plate being disposed between said flexible diaphragm and said shock absorber, and being arched toward the latter, and said base plate being disposed on that side of said flexible diaphragm remote from said shock absorber so that pressure equalization is initially induced by deformation of said flexible diaphragm and only after the latter rests against one of said plates is transfer of air effected through said throttled transfer hole in this manner making possible the damping of spring and shock-absorber oscillations effective from a specified oscillation amplitude limit as a function of structurally prescribed freedom of movement of said diaphragm.

* * * * *